United States Patent
Marqués Muñoz

(10) Patent No.: US 10,856,698 B2
(45) Date of Patent: Dec. 8, 2020

(54) HAM STAND

(71) Applicant: Jose Vicente Marqués Muñoz, Valencia (ES)

(72) Inventor: Jose Vicente Marqués Muñoz, Valencia (ES)

( * ) Notice: Subject to any disclaimer, the term of this patent is extended or adjusted under 35 U.S.C. 154(b) by 179 days.

(21) Appl. No.: 16/065,772

(22) PCT Filed: Oct. 24, 2016

(86) PCT No.: PCT/ES2016/070750
§ 371 (c)(1),
(2) Date: Jun. 22, 2018

(87) PCT Pub. No.: WO2017/109243
PCT Pub. Date: Jun. 29, 2017

(65) Prior Publication Data
US 2019/0008327 A1    Jan. 10, 2019

(30) Foreign Application Priority Data
Dec. 23, 2015 (ES) ................ 201531419 U

(51) Int. Cl.
*A47J 43/18* (2006.01)
*F16M 11/14* (2006.01)
F16M 11/10 (2006.01)

(52) U.S. Cl.
CPC .............. *A47J 43/18* (2013.01); *F16M 11/14* (2013.01); *F16M 11/105* (2013.01)

(58) Field of Classification Search
CPC ...... F16M 11/08; F16M 11/10; F16M 11/105; F16M 11/14

(Continued)

(56) References Cited

U.S. PATENT DOCUMENTS 1,359,260 A * 11/1920 Lehman, Jr. ............. B23K 3/08
                                                248/133
3,327,656 A *  6/1967 Schwartz ................. A47B 3/12
                                                108/150

(Continued)

FOREIGN PATENT DOCUMENTS

CN       2735911 Y    10/2005
DE      29720250 U1    1/1998

(Continued)

OTHER PUBLICATIONS

International search report for PCT/ES2016/070750, dated Feb. 17, 2017, 4 pages.

(Continued)

*Primary Examiner* — Reginald Alexander
(74) *Attorney, Agent, or Firm* — Danielson Legal LLC

(57) ABSTRACT

The present invention relates to a ham stand (1) that comprises a support structure (2) for a ham (3) and a base structure (4) for the assembly, and a connection element (5) of the support structure (2) with the base structure (4). The connection element (5) comprises a spherical joint (6) and a housing piece (7) of said joint (6) attached to the other structure such that it presents multiple degrees of freedom due to the combination of pivoting and rotational movements of the support structure (2) with respect to the base structure (4). Thanks to the pivoting movement, the user can rotate the ham to position it as desired in order to cut it conveniently and safely.

8 Claims, 8 Drawing Sheets

(58) Field of Classification Search
USPC ........ 99/644, 646 R; 248/133, 139, 371, 398
See application file for complete search history.

(56) References Cited

U.S. PATENT DOCUMENTS

| | | | | |
|---|---|---|---|---|
| 5,094,415 | A | * 3/1992 | Revette | A47G 23/0225 |
| | | | | 248/133 |
| 2008/0017764 | A1 | * 1/2008 | Nan | A61H 19/44 |
| | | | | 248/133 |
| 2015/0374117 | A1 | * 12/2015 | Lozano | A47B 19/06 |
| | | | | 320/107 |

FOREIGN PATENT DOCUMENTS

| | | |
|---|---|---|
| EP | 2918209 A1 | 9/2015 |
| ES | 1071381 U | 3/2010 |
| ES | 1075828 U | 12/2011 |
| ES | 1076043 U | 2/2012 |
| ES | 2467491 A1 | 6/2014 |

OTHER PUBLICATIONS

International preliminary examination report for PCT/ES2016/070750, dated Mar. 8, 2018, 6 pages.
Machine translation of Abstract of CN2735911, Espacenet, dated Jun. 27, 2018, 1 page.
Machine translation of Abstract of ES1076043, Espacenet, dated Jun. 27, 2018, 3 pages.
Machine translation of Abstract of ES1075828, Espacenet, dated Jun. 27, 2018, 2 pages.
Machine translation of Abstract of ES1071381, Espacenet, dated Jun. 27, 2018, 2 pages.

* cited by examiner

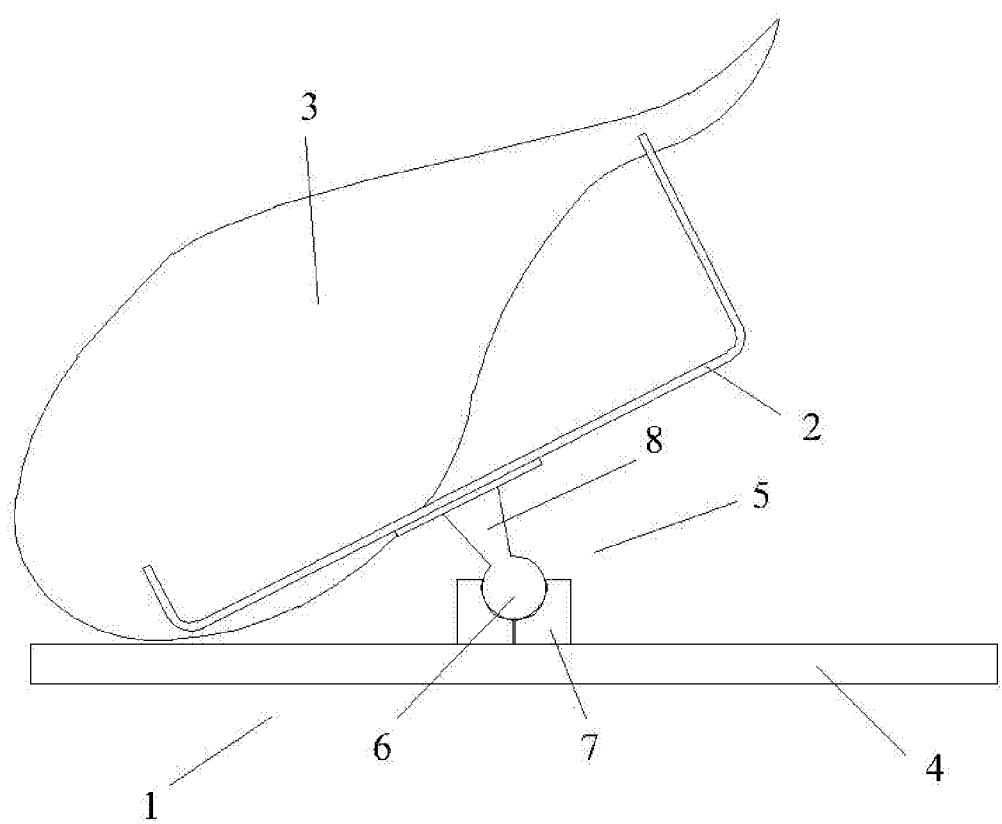
Fig. 4.1
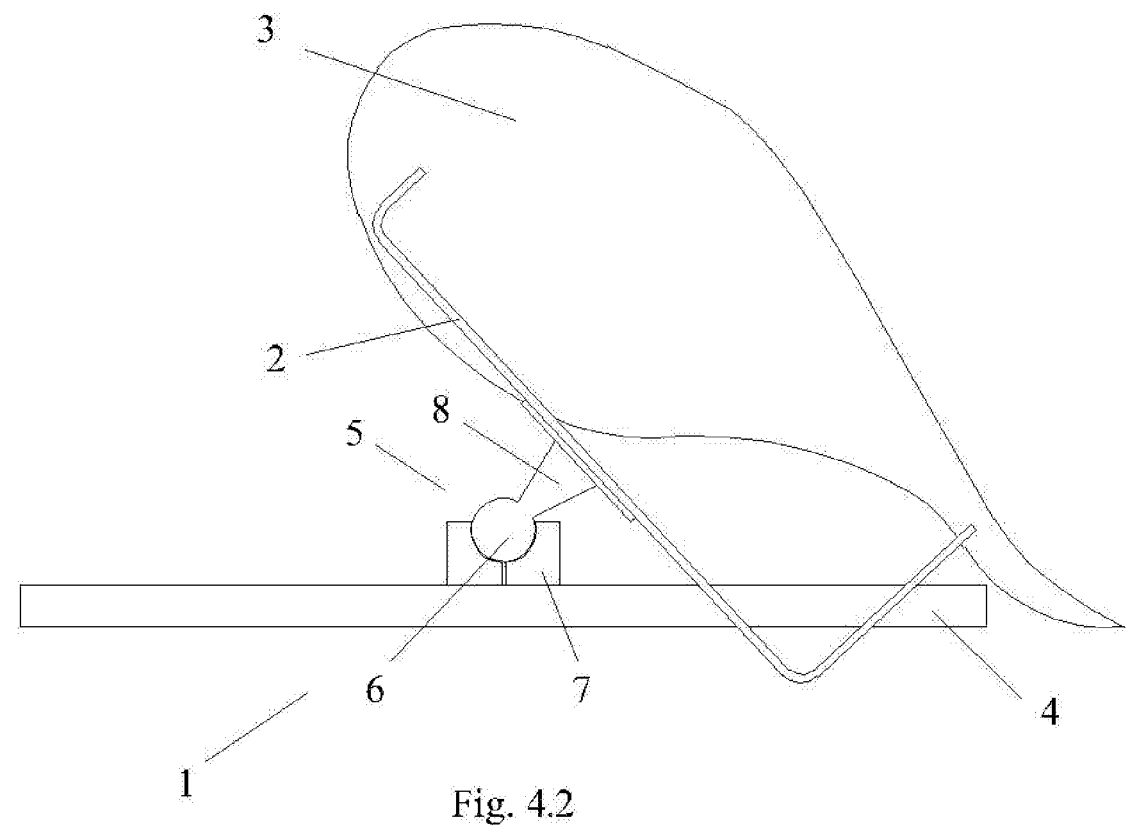
Fig. 4.2

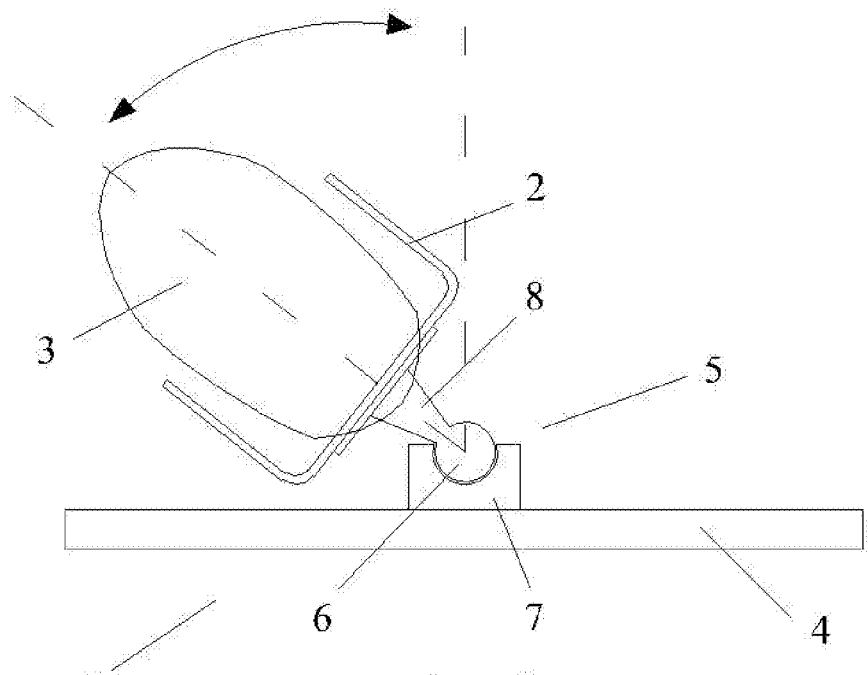
Fig. 5.1
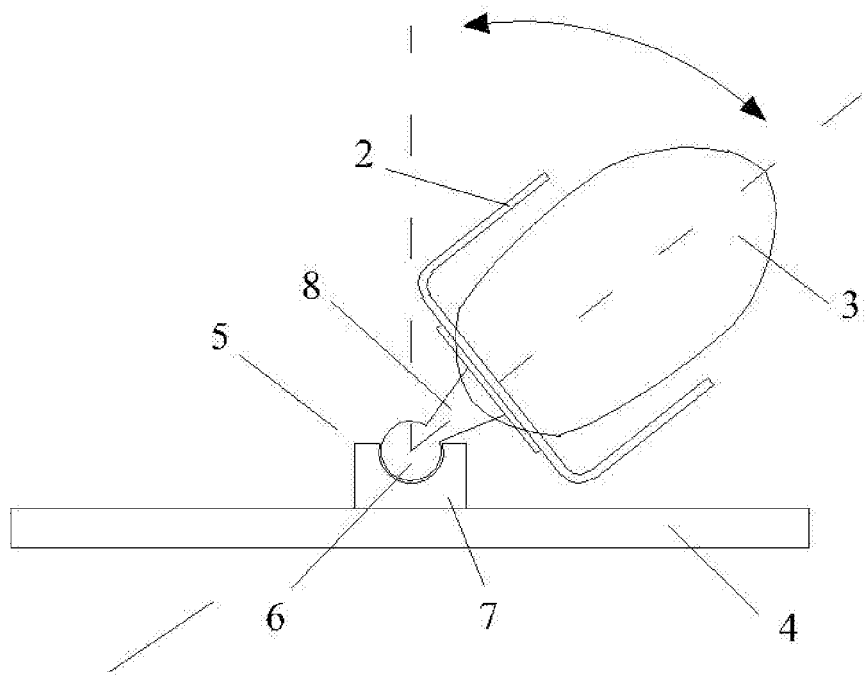
Fig. 5.2

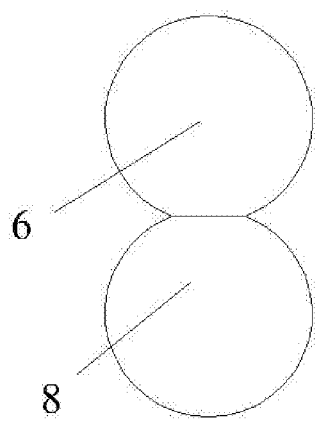
Fig. 9.1
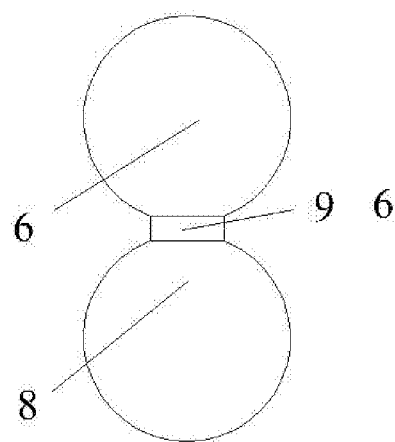
Fig. 9.2
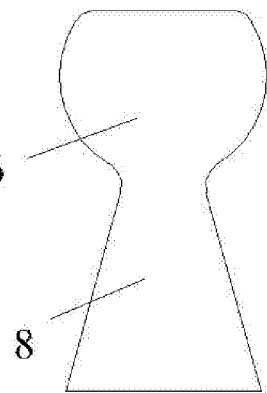
Fig. 9.3
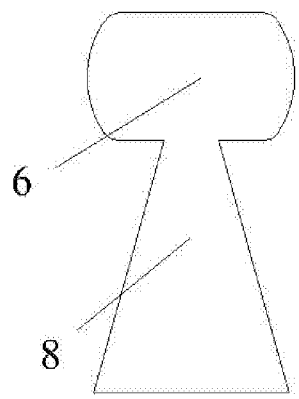
Fig. 9.4
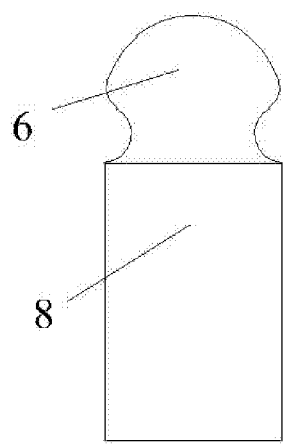
Fig. 9.5
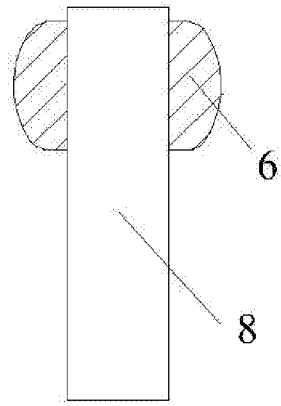
Fig. 9.6

HAM STAND

CROSS REFERENCE TO RELATED APPLICATIONS

This application is the national phase of International (PCT) Patent Application No. PCT/ES2016/070750, filed internationally on Oct. 24, 2016, which claims the benefit of Spanish patent application No. U201531419, titled "Jamonero" filed with the Spanish Patent & Trademark Office on Dec. 23, 2015, the entire disclosure of each of which is hereby incorporated by reference in their entirety.

TECHNICAL FIELD OF THE INVENTION

The present invention relates to the technical field of ham stands, specifically those that have a support structure for the piece of ham with holding means for said piece of ham and a base structure for the assembly.

BACKGROUND OF THE INVENTION

Currently there is a wide variety of ham stands which hold the ham and allow it to be cut easily.

The main characteristics needed to cut any type of ham are a firm hold of the ham stand on the ham and the proper stability thereof, which will thus avoid any problems with the knife due to instability.

Ham stands have evolved over time and now they may also be required to fulfill other conditions, such as the possible rotation of the piece of ham so that the cutter acts on it in the safest and most convenient way possible.

The state of the art contains various documents regarding ham stands of this type which incorporate some type of rotation, such as the reference documents ES1071381U, ES1075828U and ES1076043U.

The reference document ES1071381U defines a pivoting ham stand of the type that fastens peripherally, with an upper holder, to the shank or leg of the ham, and has a lower, non-mobile attachment that anchors the rump or tailbone, both of which are joined to a support structure that is attached to a flat base surface upon which a flat metal body is attached. The central area of this body has a pivoting axis that is transversely arranged and, in a way that is integral to said pivoting axis, it has a solid homogeneous piece that makes up the support structure, curved and adapted to the piece of ham.

In this case, it is observed that the ham stand may be rotated towards the rump or towards the shank of the ham as needed, such that it pivots around an axis parallel to the flat base of the ham stand. This restricts movement since only one degree of freedom is allowed by rotation around said axis, thus meaning that the user of the ham stand must rotate the entire ham stand until the proper position is found to cut the ham conveniently and safely.

In the reference document ES1075828U, the ham stand, which includes elements that immobilize the ham and allow it to be cut, is made up of a base plate with suction cups to attach and immobilize the assembly on a surface corresponding to a table, countertop or similar; with the special feature that a metal plate is ratably mounted on said base plate, said metal plate being equipped with lateral sliding rails of the corresponding bumps established to support the ham, this support being made up of a plate with attachment elements for said ham, thus establishing an assembly in which the metal plate along with the ham support rotate with respect to the base plate.

In this case, the ham stand can rotate at an angle between 0 and 360° around an axis perpendicular to the base plate, but unlike the previous case, it does not have the option of pivoting around an axis parallel to said plate, such that although the ham can rotate around a vertical axis, the user should move himself with respect to the ham stand until he is at an appropriate angle to be able to conveniently and safely cut the ham.

The reference document ES1076043U relates to a ham stand that is configured from a support base and a removable metal structure, suitable for holding a ham and allowing it to be placed in a vertical, horizontal or other intermediate position and to be adjusted to different ham sizes. Said structure comprises an arched arm, formed by a bar with a rectangular cross section and curved configuration, the ends of which incorporate adjustable means to hold the ham, and which, in turn, is held on a support point that joins the bar to the support base, the configuration of which is removable. In addition to removing and disassembling the arm, it can be rotated and pivoted around said support point to change its position.

In this case, this ham stand allows for the possible pivoting movement of the ham, which presents more degrees of freedom than in the first case mentioned since the pivoting axis is eccentric with respect to another parallel axis, and when rotated on this axis, it allows the ham stand to have many more positions after being pivoted. However, in this case the possibility of rotating the ham stand with respect to a vertical axis is not considered, such that the user has to rotate the ham stand or he himself will have to move around it until the proper position and posture is reached.

Chinese utility model CN2735911Y relates to a ham holder that requires interlocking means comprised by upright vertical nails, to fix the front part of the piece of ham. On the other hand, European patent Application EP2918209A1 describes a ham stand that only secures the rear part (hoof area) of the piece of ham, leaving the front part without supporting, that is, cantilevered.

Therefore, it is observed that the state of the art does not anticipate a ham stand that has the maximum degrees of freedom to easily and practically obtain the appropriate posture as the ham is consumed.

DESCRIPTION OF THE INVENTION

The ham stand that is presented herein is of the type that comprises a support structure for a piece of ham with holding means for said piece of ham and a base structure for the assembly. This ham stand comprises a connection element of the support structure to the base structure, where said connection element is formed by a spherical joint on at least the side area thereof connected to one of the said structures, and a housing piece of said joint is at least partially complementary to the geometry thereof and attached to the other structure, such that it presents multiple degrees of freedom due to the combination of pivoting and rotational movements of the support structure with respect to the base structure.

According to a preferred embodiment, the joint is connected to the support structure of the piece of ham and the housing piece of the joint is attached to the base structure.

According to another preferred embodiment, the joint is connected to the base structure and the housing piece of the joint is attached to the support structure of the piece of ham.

In any of the previous cases and according to a preferred embodiment, the housing piece comprises a brake mechanism of the joint.

According to another aspect, in a preferred embodiment, the distance between the support structure and the base structure is such that the rotation angle around any axis parallel to the base structure, for the pivoting movement of the support structure with respect to the base structure, is at least between 0 and 55°.

In this case and according to a preferred embodiment, the rotation angle for the rotational movement of the support structure with respect to the base structure, according to any axis comprised in the rotation angle of the pivoting movement, is between 0 and 360°.

According to a preferred embodiment, the joint comprises a connection piece to the support structure or the base structure.

In this case and according to a preferred embodiment, the joint has a spherical shape along its entire surface except in the area that joins to the connection piece.

In the case that the joint comprises a connection piece, or in the specific case that the joint also has a spherical shape, according to a preferred embodiment, the connection piece to the support structure or the base structure is formed by a truncated cone.

In the case that the joint has a spherical shape, in a preferred embodiment, the connection piece to the support structure or the base structure is formed by a second spherical joint that is directly attached to the spherical joint.

In this same case and according to another preferred embodiment, the connection piece to the support structure or the base structure is formed by a second spherical joint that is connected to the spherical joint by a cylindrical section.

According to a preferred embodiment, the connection piece to the support structure or the base structure is formed by a cylinder, where the connection thereof to the joint is carried out externally thereto.

According to another preferred embodiment, the connection piece to the support structure or the base structure is formed by a cylinder, where the connection thereof to the joint is carried out internally thereto.

The ham stand that is presented herein significantly improves upon the state of the art.

This is because it achieves a ham stand that may have a pivoting movement around any axis that is parallel to the base structure and a rotational movement around any axis comprised in the rotation angle according to the pivoting movement, or a combination of both, which presents multiple degrees of freedom.

This results in a very practical and convenient ham stand such that the user can cut the ham without having to move around the entire ham stand or even without having to move to find the right cutting angle. As such, in addition to rotating the ham to the position we are interested in, thanks to the pivoting movement, it can be swiveled to a specific angle to be cut conveniently and safely.

The resulting ham stand is very easy to use since, in addition to being practical and efficient, it is easily moved into the desired position, which is then blocked with a brake.

BRIEF DESCRIPTION OF THE DRAWINGS

For the purpose of helping to make the characteristics of the invention more readily understandable, in accordance with a preferred practical embodiment thereof, said description is accompanied by a set of drawings constituting an integral part thereof which, by way of illustration and not limitation, represent the following:

FIGS. 4.1 and 4.2 show two elevation views of the ham stand in extreme pivot positions according to an axis perpendicular to the longitudinal direction of the ham, in accordance with a first preferred embodiment of the invention.

FIGS. 5.1 and 5.2 show two profile views of the ham stand in extreme pivot positions according to an axis along the same longitudinal direction of the ham, in accordance with a first preferred embodiment of the invention.

FIGS. 9.1, 9.2, 9.3, 9.4, 9.5 and 9.6 show, respectively, an elevation view of the joint, in accordance with various preferred embodiments of the invention.

DETAILED DESCRIPTION OF A PREFERRED EMBODIMENT OF THE INVENTION

Figure 1:
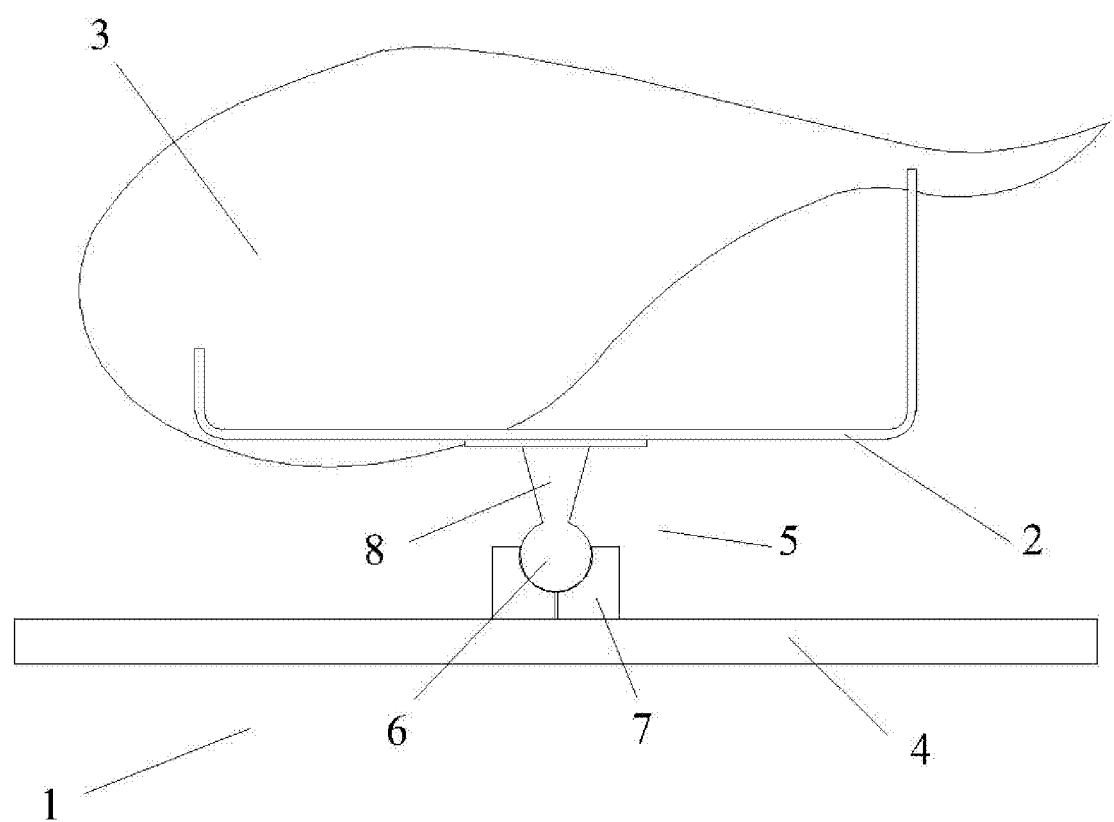
FIG. 1 shows an elevation view of the ham stand with the ham in a vertical position, in accordance with a first preferred embodiment of the invention.
Figure 2:
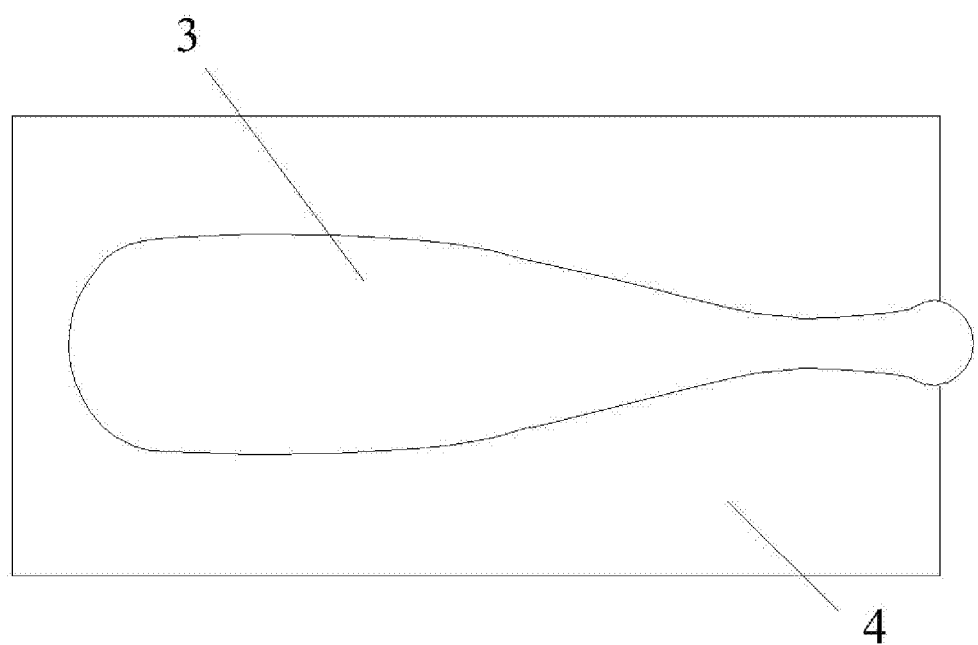
FIG. 2 shows a plan view of the ham stand with the ham in a vertical position, in accordance with a first preferred embodiment of the invention.

With reference to the figures provided, it can be observed how in the first preferred embodiment of the invention the ham stand 1 of those that comprise a support structure 2 of the piece of ham 3 with holding means for said piece of ham 3 and a base structure 4 for the assembly that is proposed herein comprises a connection element 5 of the support structure 2 to the base structure 4, where said connection element 5 comprises a spherical joint 6 on at least the side area of the same connected to one of said structures and a housing piece 7 of said joint 6 that is at least partially complementary to the geometry thereof and attached to the other structure, such that it presents multiple degrees of freedom due to the combination of pivoting and rotational movements of the support structure 2 with respect to the base structure 4.

Figure 3:
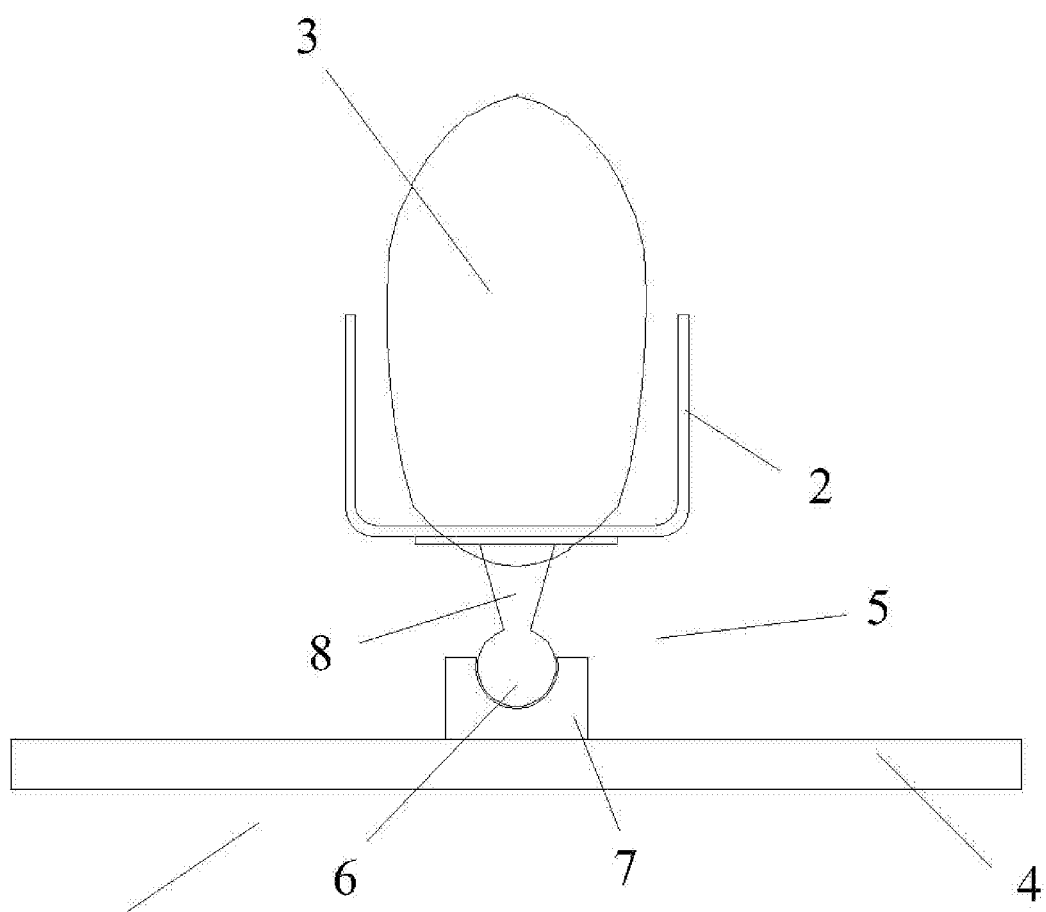
FIG. 3 shows a profile view of the ham stand with the ham in a vertical position, in accordance with a first preferred embodiment of the invention.

As shown in FIGS. 1, 3, 4.1, 4.2, 5.1 and 5.2, in this first preferred embodiment of the invention, the joint 6 is connected to the support structure 2 of the piece of ham and the housing piece 7 of the joint is attached to the base structure 4. Said housing piece 7 comprises a braking mechanism on the joint 6 (not shown in the Figures), such that this braking mechanism fixes the joint 6 in the desired position once it is reached.

Likewise, as may be seen in said Figures, the joint 6 comprises a connection piece 8 to the support structure 2 or the base structure 4.

Thus, in this first preferred embodiment of the invention, it shows that the joint 6 has a spherical shape along its entire surface except in the area that joins to the connection piece 8, where in this case, this connection piece 8 is connected to the support structure 2, formed by a truncated cone. An elevation view of the joint can be seen in FIG. 7.

In terms of the pivoting movement, in this first preferred embodiment of the invention as can be seen in FIGS. 4.1, 4.2, 5.1 and 5.2, the distance between the support structure 2 and the base structure 4 is such that the rotation angle around any axis parallel to the base structure 4, for the pivoting movement of the support structure 2 with respect to the base structure 4, is at least between 0 and 55°.

Figure 6:
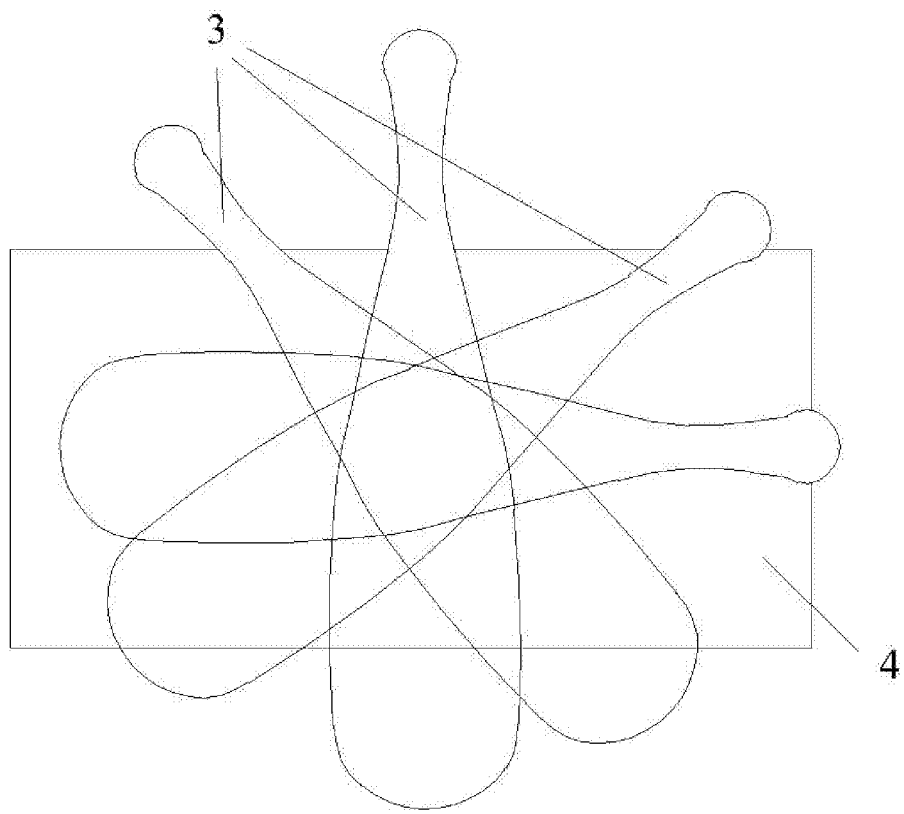
FIG. 6 shows a plan view of several possible overlapping positions due to rotation on an axis perpendicular to the support structure of the ham stand, with a pivot angle of 0°, in accordance with a first preferred embodiment of the invention.

As shown in FIG. 6, the rotation angle for the rotational movement of the support structure 2 with respect to the base structure 4, according to any axis comprised in the rotation angle of the pivoting movement, is between 0 and 360°.

Figure 8:
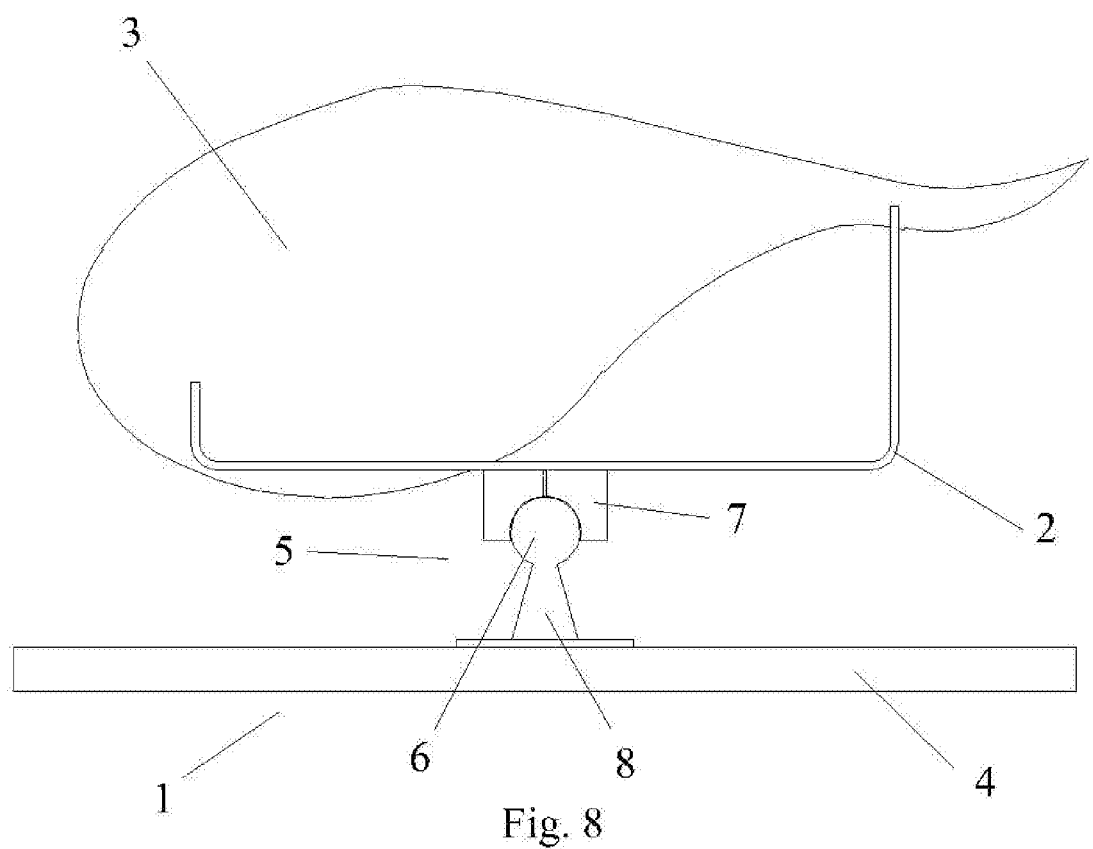
FIG. 8 shows an elevation view of the ham stand with the ham in a vertical position, in accordance with a second preferred embodiment of the invention.

A second preferred embodiment of the invention is presented in this specification, in which the ham stand 1 is similar to that of the first embodiment proposed except for the fact that in this case the joint 6 is connected to the base support 4 and the housing piece 7 of the joint is attached to the support structure of the piece of ham 3, as shown in FIG. 8.

In FIGS. 9.1, 9.2, 9.3, 9.4, 9.5, and 9.6, the joint 6 can be seen for other possible preferred embodiments of the invention, all of them containing joints 6 that comprise a connection piece 8 to the support structure 2 or the base structure 4.

Thus, it may be a joint 6 formed by a sphere which lacks a spherical segment in the area opposite to the area that joins to the connection piece 8, as shown in FIG. 9.3, with a truncated cone-shaped connection piece 8, or a spherical joint 6 which lacks a spherical segment both in the area that joins to the connection piece 8 and in the area opposite the same, as shown in FIG. 9.4, which also has a truncated cone connection piece 8.

Figure 7:
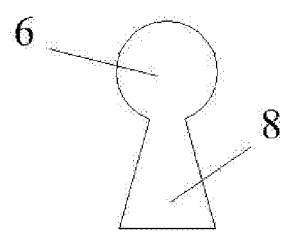
FIG. 7 shows an elevation view of the joint, in accordance with a first preferred embodiment of the invention.

It is also possible that the joint 6 has a spherical shape along its entire surface except in the area that joins to the connection piece 8, and where said connection piece 8 is in the shape of a truncated cone. This is the case of the proposed first and second embodiments and which is shown in FIG. 7.

Another possibility for the joint 6 is that which can be seen in FIG. 9.1, where the joint is spherical, like in the proposed first and second preferred embodiments, and the connection piece 8 is formed by a second spherical joint that is directly attached to the spherical shape of the joint 6.

FIG. 9.2 shows a spherical joint 6 with a connection piece 8 that is formed by a second joint that is equally spherical and connected to the spherical joint 6 by a cylindrical section 9.

In addition, another possible case for the joint 6 can be seen in FIG. 9.5, in which the connection piece 8 to the support structure 2 or the base structure 4 is formed by a cylinder, where the connection thereof to the joint is carried out externally thereto.

As shown in FIG. 9.6, another possible case for the joint 6 is one in which the connection piece 8 to the support structure 2 or the base structure 4 is formed by a cylinder, where the connection thereof to the joint 6 is carried out internally thereto.

The ham stand that is presented herein achieves major improvements relative to the state of the art because it significantly increases the convenient and safe use of ham stands since it can be easily positioned in the direction and angle considered to be most appropriate for the correct cutting posture of the user.

Therefore, the combination of possible movements offers the option of pivoting around the axes parallel to the base structure, pivoting from the shank to the rump of the ham as well as from side to side, and rotating around any axis comprised in the possible pivoting angle with the possibility of rotating between 0 and 360°, or with any of the possible combinations of the previous movements. This creates many mobility options and the possibility to place the piece of ham at the appropriate position and angle for the cut to be made in optimal conditions of convenience and safety.

Therefore, this ham stand is very efficient, convenient and safe.

The invention claimed is:

1. A ham stand (1) comprising a support structure (2) of the piece of ham (3) with holding means for said piece of ham (3), a base structure (4) for an assembly, and a connection element (5) of the support structure (2) to the base structure (4), characterized in that said connection element (5) comprises:
   a spherical joint (6) on at least the side area of that joint (6) connected to one of the structures (2, 4); and
   a housing piece (7) of the joint (6) that is at least partially complementary to the geometry of the joint (6), said housing piece (7) being attached to the other structure (2, 4), such that it presents multiple degrees of freedom due to the combination of pivoting and rotational movements of the support structure (2) with respect to the base structure (4);
   wherein:
   the distance between the support structure (2) and the base structure (4) is such that the rotation angle around any axis parallel to the base structure (4), for the pivoting movement of the support structure (2) with respect to the base structure (4), is at least between 0 and 55°;
   the rotation angle for the rotational movement of the support structure (2) with respect to the base structure (4), according to any axis comprised in the rotation angle of the pivoting movement, is between 0 and 360°;
   the joint (6) comprises a connection piece (8) to the support structure (2) or the base structure (4);
   the joint (6) has a spherical shape along its entire surface except in the area that joins to the connection piece (8); and
   the connection piece (8) to the support structure (2) or to the base structure (4) is formed by a truncated cone.

2. The ham stand (1) according to claim 1, characterized in that the joint (6) is connected to the support structure (2) of the piece of ham (3) and the housing piece (7) of the joint is attached to the base structure (4).

3. The ham stand (1) according to claim 1, characterized in that the joint (6) is connected to the base structure (4) and the housing piece (7) of the joint is attached to the support structure (2) of the piece of ham (3).

4. The ham stand (1), according to claim 1, characterized in that the connection piece (8) to the support structure (2) or the base structure (4) is formed by a cylinder, where the connection thereof to the joint (6) is carried out externally thereto.

5. The ham stand (1), according to claim 1, characterized in that the connection piece (8) to the support structure (2) or the base structure (4) is formed by a cylinder, where the connection thereof to the joint (6) is carried out externally thereto.

6. The ham stand (1) according to claim 1, wherein:
   a user can rotate and lock the ham stand at any desired angle between 0 and 55°; and
   the user can rotate and lock the ham stand around any axis comprised in the rotation angle of the pivoting movement between 0 and 360°.

7. A ham stand (1) comprising a support structure (2) of the piece of ham (3) with holding means for said piece of ham (3), a base structure (4) for an assembly, and a connection element (5) of the support structure (2) to the base structure (4), characterized in that said connection element (5) comprises:

a spherical joint (6) on at least the side area of that joint (6) connected to one of the structures (2, 4); and a housing piece (7) of the joint (6) that is at least partially complementary to the geometry of the joint (6), said housing piece (7) being attached to the other structure (2, 4), such that it presents multiple degrees of freedom due to the combination of pivoting and rotational movements of the support structure (2) with respect to the base structure (4);

wherein:

the distance between the support structure (2) and the base structure (4) is such that the rotation angle around any axis parallel to the base structure (4), for the pivoting movement of the support structure (2) with respect to the base structure (4), is at least between 0 and 55°, the rotation angle for the rotational movement of the support structure (2) with respect to the base structure (4), according to any axis comprised in the rotation angle of the pivoting movement, is between 0 and 360°, the joint (6) comprises a connection piece (8) to the support structure (2) or the base structure (4); and the joint (6) has a spherical shape along its entire surface except in the area that joins to the connection piece (8), characterized in that the connection piece (8) to the support structure (2) or the base structure (4) is formed by a second spherical joint that is directly attached to the spherical joint (6).

8. A ham stand (1) comprising a support structure (2) of the piece of ham (3) with holding means for said piece of ham (3), a base structure (4) for an assembly, and a connection element (5) of the support structure (2) to the base structure (4), characterized in that said connection element (5) comprises:

a spherical joint (6) on at least the side area of that joint (6) connected to one of the structures (2, 4); and a housing piece (7) of the joint (6) that is at least partially complementary to the geometry of the joint (6), said housing piece (7) being attached to the other structure (2, 4), such that it presents multiple degrees of freedom due to the combination of pivoting and rotational movements of the support structure (2) with respect to the base structure (4);

wherein:

the distance between the support structure (2) and the base structure (4) is such that the rotation angle around any axis parallel to the base structure (4), for the pivoting movement of the support structure (2) with respect to the base structure (4), is at least between 0 and 55°, the rotation angle for the rotational movement of the support structure (2) with respect to the base structure (4), according to any axis comprised in the rotation angle of the pivoting movement, is between 0 and 360°, the joint (6) comprises a connection piece (8) to the support structure (2) or the base structure (4); and the joint (6) has a spherical shape along its entire surface except in the area that joins to the connection piece (8), characterized in that the connection piece (8) to the support structure (2) or the base structure (4) is formed by a second spherical joint that is connected to the spherical joint (6) by a cylindrical section (9).

* * * * *